(12) United States Patent  (10) Patent No.: US 7,811,162 B2
Flickinger                    (45) Date of Patent:    Oct. 12, 2010

(54) COMBINE ROTOR ASSEMBLY WITH PROGRESSIVE PITCH ELEMENT PATTERN

(75) Inventor: Wayne T. Flickinger, Oxford, PA (US)

(73) Assignee: CNH America LLC, New Holland, PA (US)

( * ) Notice: Subject to any disclaimer, the term of this patent is extended or adjusted under 35 U.S.C. 154(b) by 167 days.

(21) Appl. No.: 12/187,528

(22) Filed: Aug. 7, 2008

(65) Prior Publication Data

US 2009/0042624 A1   Feb. 12, 2009

Related U.S. Application Data

(60) Provisional application No. 60/963,908, filed on Aug. 7, 2007.

(51) Int. Cl.
*A01F 12/34* (2006.01)
(52) U.S. Cl. .................................................. 460/71
(58) Field of Classification Search .............. 460/71, 460/72, 112, 68, 66, 69, 109
See application file for complete search history.

(56) References Cited

U.S. PATENT DOCUMENTS

| 234,599 | A | | 11/1880 | McClung | |
|---|---|---|---|---|---|
| 516,926 | A | | 3/1894 | Geiser | |
| 4,607,480 | A | * | 8/1986 | Yarmashev et al. | 460/66 |
| 4,889,517 | A | | 12/1989 | Strong et al. | 460/66 |
| 4,964,838 | A | * | 10/1990 | Cromheecke et al. | 460/66 |
| 5,035,675 | A | * | 7/1991 | Dunn et al. | 460/62 |
| 5,125,871 | A | * | 6/1992 | Gorden | 460/69 |
| 5,919,086 | A | * | 7/1999 | Derry | 460/72 |
| 6,264,553 | B1 | * | 7/2001 | Neumann et al. | 460/71 |
| 6,325,714 | B1 | | 12/2001 | Tanis et al. | 460/71 |
| 6,375,564 | B1 | | 4/2002 | Amann et al. | 460/66 |
| 6,447,394 | B1 | * | 9/2002 | Gryspeerdt | 460/109 |
| 7,022,013 | B1 | * | 4/2006 | Van Quekelberghe et al. | 460/66 |
| 2005/0096108 | A1 | * | 5/2005 | Van Quekelberghe et al. | 460/66 |
| 2006/0025186 | A1 | * | 2/2006 | Quekelberghe et al. | 460/66 |

FOREIGN PATENT DOCUMENTS

| JP | 1202219 | 8/1989 |
|---|---|---|
| JP | 2039822 | 2/1990 |
| JP | 3035722 | 2/1991 |
| JP | 6153669 | 6/1994 |
| JP | 6292445 | 10/1994 |
| JP | 1004767 | 1/1998 |
| JP | 1084757 | 4/1998 |
| JP | 333627 | 12/2001 |

* cited by examiner

*Primary Examiner*—Árpád Fábián-Kovács
(74) *Attorney, Agent, or Firm*—Michael G. Harms; Patrick M. Sheldrake

(57) ABSTRACT

A rotor assembly for a threshing system of a combine provides effective grain threshing and separation, while doing so in a manner that conserves power and avoids usage spikes and the like, by providing at least two helical patterns of elements for threshing and separating, having a helical pitch that progressively changes by an advantageous extent, while spacing between adjacent ones of the elements of each pattern is held about constant.

19 Claims, 5 Drawing Sheets

COMBINE ROTOR ASSEMBLY WITH PROGRESSIVE PITCH ELEMENT PATTERN

This application claims the benefit of U.S. Provisional Patent Application Ser. No. 60/963,908, filed Aug. 7, 2007.

TECHNICAL FIELD

This invention relates generally to a rotor assembly for an agricultural combine, and more particularly, to a pattern of threshing and separating elements on a rotor for threshing and separating crop material that is fed into the rotor assembly, which provides smooth, effective threshing and separating functions, with good power usage characteristics.

BACKGROUND OF THE INVENTION

U.S. Provisional Application No. 60/963,908, filed Aug. 7, 2007, is incorporated herein in its entirety by reference.

An agricultural combine generally includes a header mechanism that severs and collects crop material as the combine is driven through a field, and a feeder mechanism that feeds the crop material to a threshing system or mechanism in the combine. The threshing mechanism includes a rotor assembly. The rotor assembly may include one or more rotatable rotors or tubes. The crop material is threshed as it passes between the rotating rotor or tube and a cylindrical housing or cage of the rotor assembly, the housing or cage having an arrangement of concaves, separator grates, and covers, of which, at least the concaves and grates have apertures for the passage of grain, and elements of material other than grain (MOG), to a cleaning system of the combine.

Typically, the rotor has a front portion, a rear portion and an outer surface that is spaced proximate the cylindrical housing. Reference as examples, old designs such as disclosed in McClung, U.S. Pat. No. 234,599, issued Nov. 16, 1880, and Geiser, U.S. Pat. No. 516,926, issued Mar. 20, 1894; and more modern designs, including Strong et al., U.S. Pat. No. 4,889,517, issued Dec. 26, 1989; Cromheecke et al., U.S. Pat. No. 4,964,838, issued Oct. 23, 1990, (both of which are twin rotor designs); Tanis et al., U.S. Pat. No. 6,325,714, issued Dec. 4, 2001; and Amann et al., U.S. Pat. No. 6,375,564, issued Apr. 23, 2002 (single rotor designs). Generally, on a rotor a number of discrete, outwardly extending elements for threshing and/or separating the crop, secured to the outer surface in one or more predetermined patterns, typically helical patterns. As the rotor rotates, crop material enters the space between the rotor and the housing and is formed into a mat. This mat of crop material contains grain attached to crop heads or ears, and is circulated in a helical manner through the space, by the rotation of the rotor and the elements, typically in cooperation with guide vanes on the inner surface of the cylindrical housing. The speed of rotation of the rotor can range from a few hundred revolutions per minute, to over a thousand. As the crop mat is circulated through the space, it will be initially threshed, largely by the elements configured for threshing, which typically comprise rasp bars of some configuration for essentially raking the material against the inner surface of the housing or cage, to release the grain from the crop material. The released grain will be separated from the MOG for passage through the apertures of the concave and grates to a cleaning system of the combine, as facilitated in large part by the separating elements or bars, which on some rotors are wider than the rasp bars relative to the direction of rotation, as illustrated in Tanis et al., U.S. Pat. No. 6,325,714. Some of the rasp bars may comprise wider bars also. Thus, it has been found that, as the material passes through the space, the threshing and separation needs will vary with position along the rotor. Typically, a high density of threshing elements will be needed to ensure adequate threshing, but may not be needed for separating. The largely grain free MOG will then be ejected from the rear end of the assembly, for discharge from the combine. Here, it should be noted that the terms "front" and "rear" are used merely as directional references, and are not intended to be limiting in regard to the rotor assembly of the present invention, or to the possible orientations of the rotor or rotor assembly in the combine or otherwise.

As addressed in the above referenced Tanis et al. U.S. Pat. No. 6,325,714, crop material sometimes has a tendency to form clumps against elongated threshing and separating elements, which can make their use disadvantageous. In addition, in configurations where two elongated threshing or separating elements are arranged along the same line, a roll of crop material may form against the multiple elongated elements, which is also a disadvantage. Disadvantages of such clumping and formation of rolls is that they can affect the capacity of the rotor assembly, namely, by reducing it. Further, when the rotor encounters clumps or rolls of material, increased power may be required to maintain a normal threshing operation. This increased power requirement can result in a torque spike in the rotor, which generally tends to decrease the effective life of the rotor and, possibly, of the rotor drive. Also, if a high density of elements exists throughout the space between the rotor and housing, excessive amounts of power may be consumed unnecessarily. Conversely, if the density of elements is too low, insufficient threshing can occur and high grain loss experienced.

What is sought therefore, is a rotor assembly which overcomes one or more of the problems and disadvantages set forth above, namely, clumping and rolling of crop material, excessive power consumption and spikes, and inefficient threshing and grain loss.

SUMMARY OF THE INVENTION

What is disclosed is a rotor assembly for a threshing system of a combine, which overcomes one or more of the problems and disadvantages set forth above, namely, by providing effective grain threshing and separation, while doing so in a manner that conserves power and avoids usage spikes and the like, namely, by providing a pattern of elements for threshing and separating, having a pitch that progressively changes by an advantageous extent.

According to a preferred aspect of the invention, the rotor assembly includes an elongate rotor having a front inlet portion, a rear portion and a generally cylindrical outer surface disposed between the front portion and the rear portion, the rotor being rotatable about a longitudinally extending rotational axis therethrough. The rotor assembly includes a plurality of outwardly extending elements or projections for performing threshing and separating functions, hereinafter referred to collectively as "threshing elements" mounted individually on the outer surface in at least two axially spaced apart, continuous helical patterns therearound extending from about the front inlet portion to about the rear portion. Adjacent ones of the threshing elements along each of the helical patterns are located or spaced about equidistant apart, respectively, and define a helical pitch of the helical pattern therebetween. Helical pitch in this context is defined as an angle of a line extending between two or more of the threshing elements of one of the helical patterns, relative to a line perpendicular to the rotational axis.

Overall, it is an object of the invention to provide desired threshing and separating function by controlling the helical pitch of the parallel patterns of threshing elements, in particular, by progressively changing the pitch to achieve the desired function. It is also desired to reduce or eliminate need for wider elements (separator bars) and the disadvantages that they entail, as noted above.

In a preferred embodiment of the invention, the pitches of both of the helical patterns have a generally constant value, that is, no more than a marginally varying value, through a first or mainly threshing region of the rotor located adjacent to the front inlet portion, and the helical patterns are continuously and substantially uniformly spaced about a first axial distance apart one relative to the other throughout the first region.

The pitches of the helical patterns have values which gradually or progressively increase from the first value to a second value greater than the first value through a second or transition region of the rotor extending from the first region toward the rear portion of the rotor, such that throughout the second region the helical patterns are continuously spaced an axial distance apart which gradually or progressively increases from the first axial distance toward the rear portion of the rotor.

The pitches of the helical patterns are preferably generally constant at the second value, or vary only marginally therefrom, through a third or separating region extending rearwardly from the second region to the rear portion of the rotor, such that throughout the third region the helical patterns are continuously and substantially uniformly spaced about a second axial distance apart which is several times greater than the first axial distance.

According to another preferred aspect of the invention, the first value for the helical pitch comprises an angle of from about 6 to about 10 degrees relative to a line perpendicular to the rotational axis, and more preferably, an angle of about 9 degrees. This provides a greater threshing element density, which provides thorough threshing function about this region of the rotor, and also substantial separating, as a result of the large amount of grain detached from the MOG.

According to another preferred aspect of the invention, the second value comprises an angle of from about 12 to about 15 degrees relative to a line perpendicular to the rotational axis, and more preferably, about 13 to about 14 degrees. Advantageously, this results in a second axial distance between the helical patterns which is preferably equal to at least 4 times the first axial distance, and more preferably, about 5 times the first axial distance, which provides a threshing element density which allows expansion of the crop mat, for releasing remaining loose grain. In the second region, the pitch values will preferably progressively or gradually increase from the first value to the second, to transition element function from more threshing to more separating.

According to yet another preferred aspect of the invention, the elements comprise rasp bars comprising rows of serrations or raised elongate elements on a radial outer surface, which is a known configuration for threshing, which in this invention are used along substantially the entire length of the helical patterns, thereby reducing or eliminating the need for wider separating bars, which can cause the above discussed clumping and rolling problems.

According to still another preferred aspect of the invention, the first region comprises at least two revolutions or twists of each of the helical patterns about the rotor, the second region comprises at least about two revolutions of each of the patterns, and the third region comprises at least about three revolutions of each of the patterns.

Thus, according to the invention, threshing element density is configured to gradually decrease through the second region of the rotor, as a result of the gradual increase or progression in axial spacing between the helical patterns, and corresponding to the gradually lessened amount of threshing and greater separating required. The density is constant or decreases only somewhat in the third or last region, such that mostly separating of the remaining grain from the MOG is occurring before the MOG is discharged from the threshing system.

The changing densities of threshing elements are advantageously configured to be sufficiently gradual so as not to disrupt or cause a discontinuity in the flow of the crop material through the rotor assembly, and so as to minimize or avoid clumping or rolling of the crop material, which effect is facilitated by the spacing between the helical patterns, which spacing is continuous and uninterrupted, and as noted, gradually increases or progresses from the more dense first region where most of the threshing occurs. As a result, rotor power consumption has been found to be more uniform and not subject to spikes and other irregularities.

In the preferred embodiment, there are no wide threshing or separating elements extending between or bridging the helical patterns, which can obstruct crop material flow and cause power consuming clumps and rolls. And, the smoothness of power consumption is facilitated by the regular and uniform distance between adjacent ones of the threshing elements of each of the helical patterns about the rotor.

DETAILED DESCRIPTION OF THE INVENTION

Figure 1:
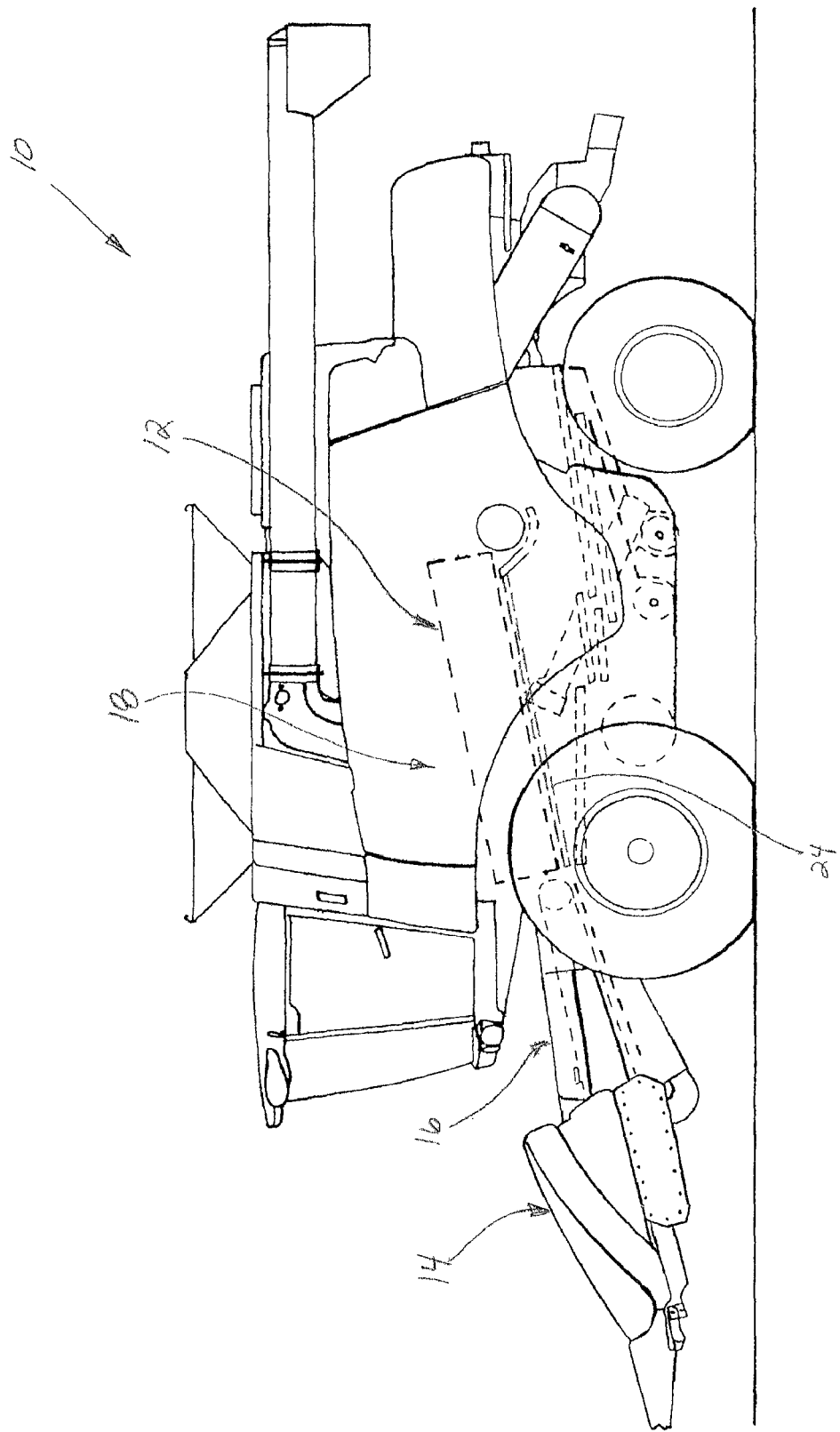
FIG. 1 is a simplified side view of an agricultural combine showing the general location of a rotor assembly.

Referring to FIG. 1, a self-propelled combine 10 incorporates a preferred embodiment of a rotor assembly 12, constructed and operable according to the teachings of the present invention. Combine 10 also includes a header 14 for severing and gathering crop materials, and a feeder mechanism 16 for elevating and advancing crop material towards a threshing system 18 in combine 10, of which rotor assembly 12 forms a part.

Figure 2:
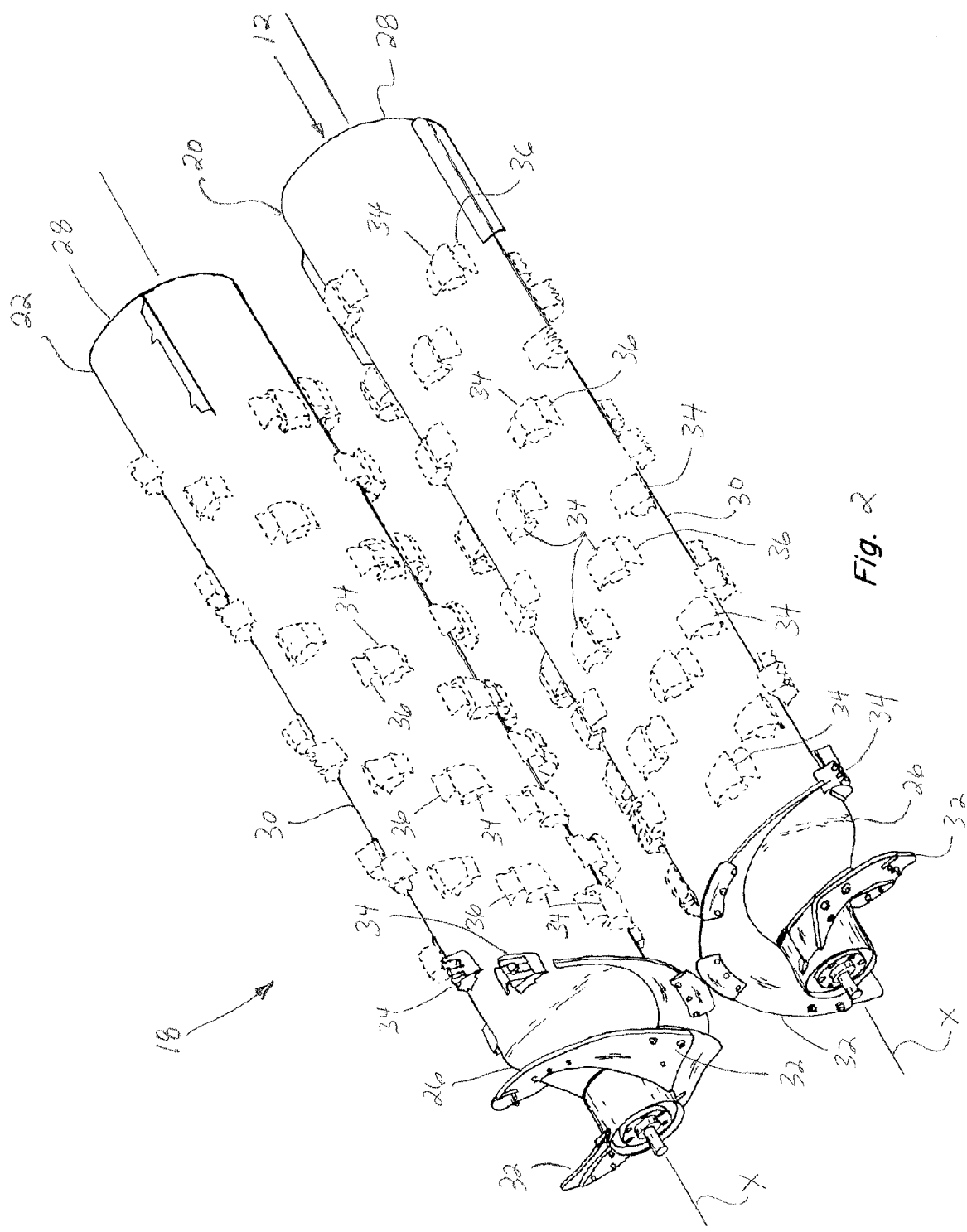
FIG. 2 is a perspective view of the rotor assembly shown in FIG. 1, which is a twin rotor configuration, illustrating aspects of the present invention.

Referring also to FIG. 2, threshing system 18 of combine 10 is comprised of rotor assembly 12, which includes a side-by-side pair of rotors 20 and 22, each mounted for rotation about an inclined, longitudinal axis X, although it should be recognized and understood that the teachings of the invention are also applicable to a single rotor configuration. Rotors 20 and 22 are counter-rotatable one relative to the other, by a rotor drive (not shown) of combine 10, in the conventional and well-known manner. Rotors 20 and 22 are each disposed within a stationary, substantially cylindrical housing 24 (depicted schematically in FIG. 1) that is provided with a conventional "concave and grate" configuration, also in the well known manner. Each of rotors 20 and 22 has a front inlet portion 26, a rear portion 28 and a cylindrical surface portion 30 extending therebetween. Helical impeller blades 32 are attached to front portion 26.

Generally, in operation, as rotors 20 and 22 are rotated by the drive, and combine 10 is propelled over a field, header 14 will operate to cut and gather the crops, and direct and them into feeder mechanism 16. Feeder mechanism 16 will then form the cut crops into a mat and feed the mat of cut crops into the inlet region of rotor assembly 12, where they will be picked up by impeller blades 32 of the rotors and conveyed into the spaces between the outer surface portions 30 of the rotors and the housings, respectively. In each of these spaces, the crop material will be circulated by the rotation of the respective rotor in a generally helical manner about outer surface portion 30 of the rotor, such that the grain will be detached and separated from the MOG, for passage through the apertures of housing 24 enroute to a cleaning system of combine 10 disposed beneath threshing system 18. To effect the helical circulation of the crop material about the individual rotors, and thresh and separate the grain therefrom in a desired and advantageous manner, namely, one that conserves power and avoids usage spikes and other undesirable characteristics, the rotors each include a plurality of individual threshing elements 34 disposed about surface portion 30 thereof in predetermined parallel helical patterns according to the present invention.

Figure 3:
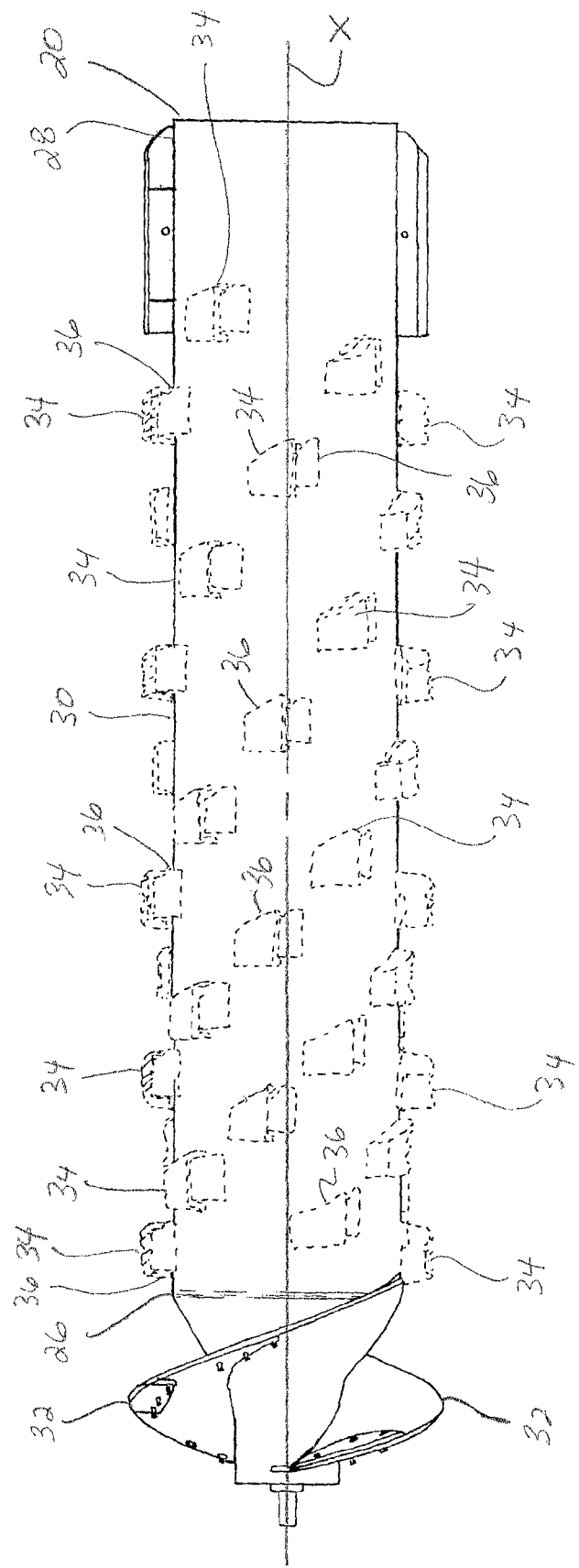
FIG. 3 is a side view of a rotor of the rotor assembly shown in FIG. 2.
Figure 4:
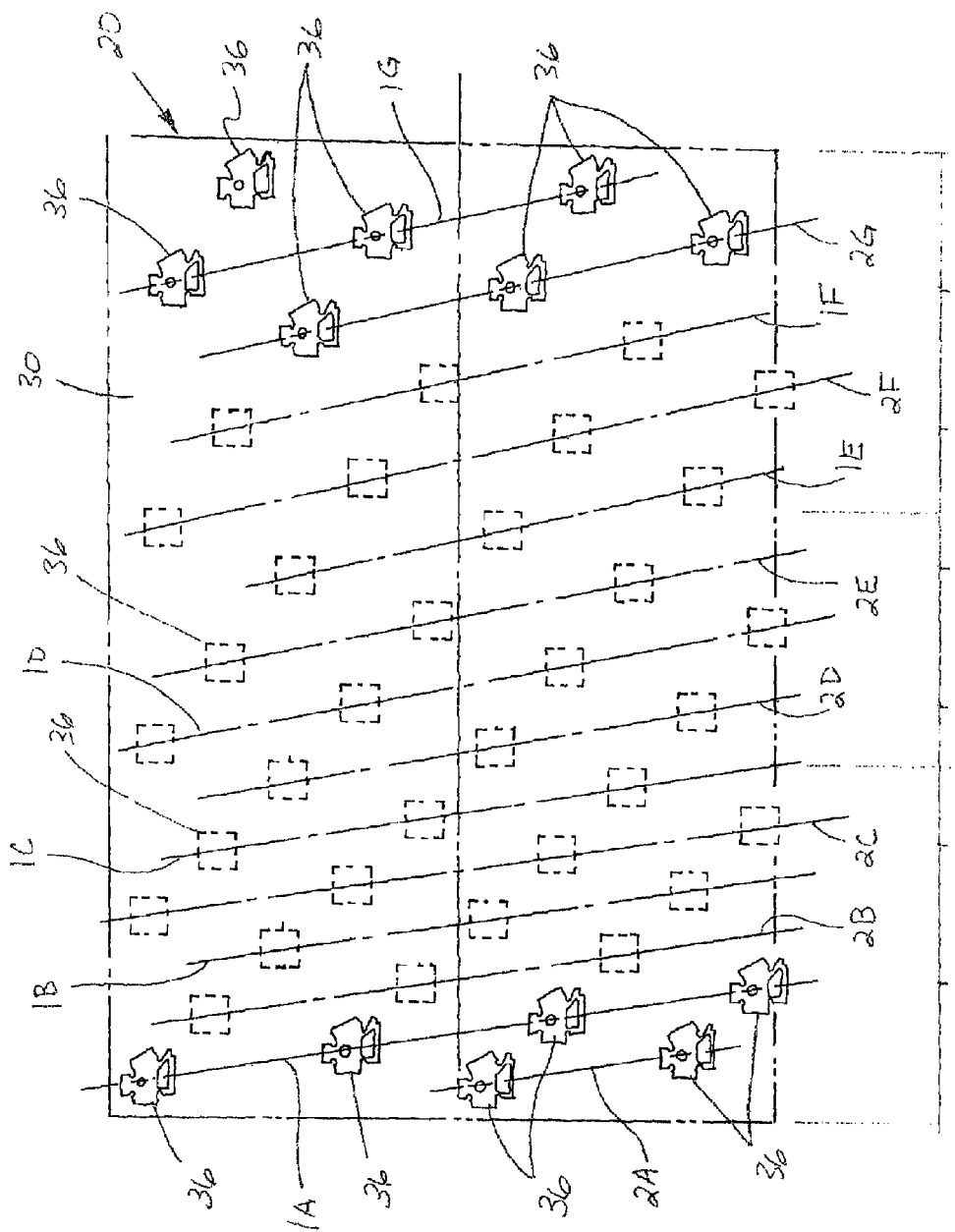
FIG. 4 is a layout view of mounting elements for threshing elements of the rotor assembly, showing lines representative of helical patterns of the threshing elements.
Figure 5:
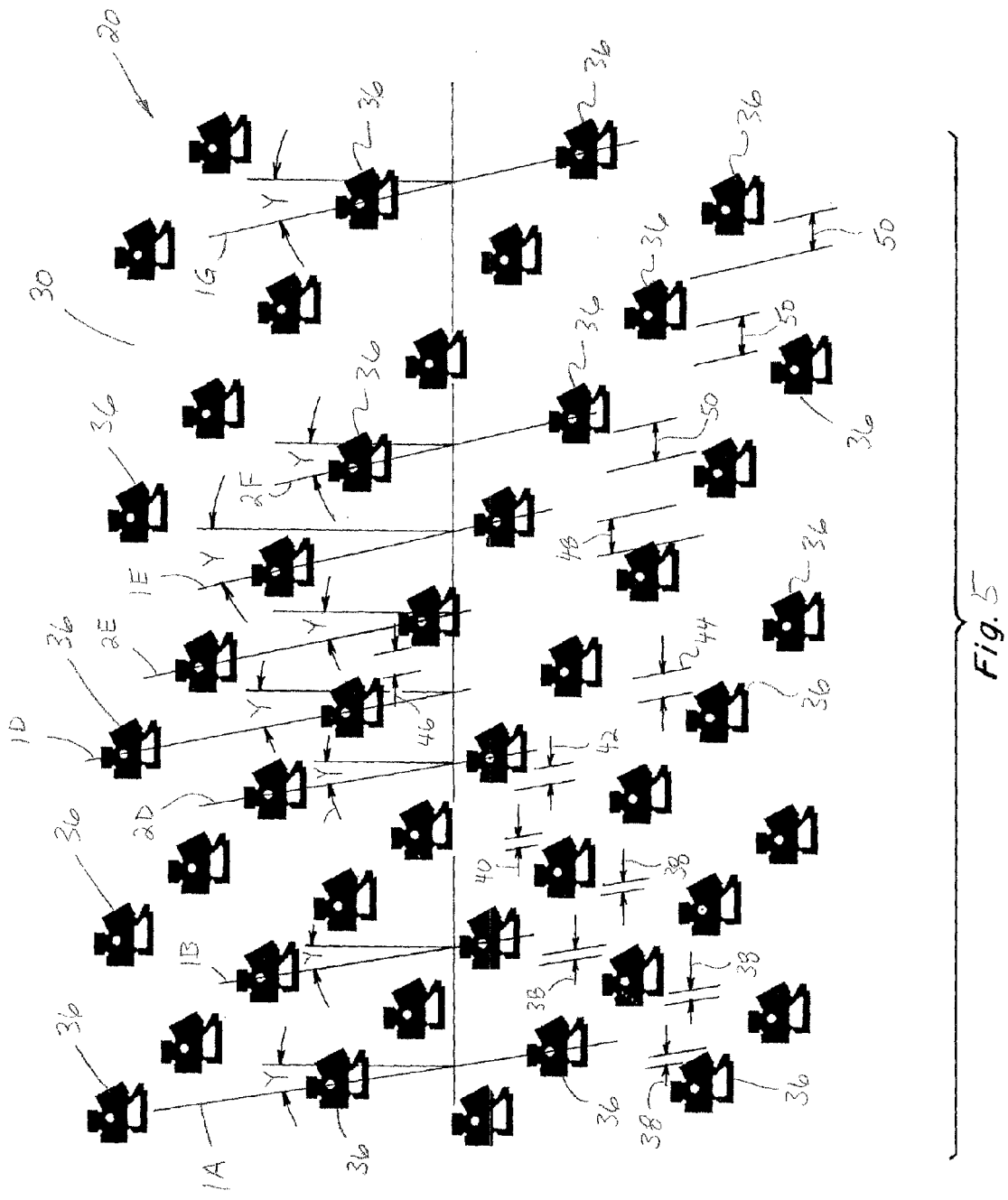
FIG. 5 is another layout view of the mounting elements for the threshing elements of the rotor assembly, illustrating helical pitch and axial spacings of the helical patterns at various locations therealong.

Referring also to FIG. 3-5, rotor 20 which is also representative of rotor 22, is shown in a side view illustrating the patterns of threshing elements 34 thereabout (FIG. 3), and in a flattened view (FIGS. 4 and 5), showing the layout of mounting brackets 36 for supporting elements 34 on cylindrical surface portion 30 of the rotor, which is also representative of the positions of elements 34 thereon. According to the invention, threshing elements 34 are laid out in two axially spaced apart, continuous helical patterns extending around surface portion 30 of rotor 20 (and also of rotor 22) extending from about front portion 26 to about rear portion 28. Segments or ranks of the first helical pattern are identified in FIG. 4 by a series of lines drawn through mounting brackets 36 of that pattern, and segments of the second helical pattern are identified by a parallel series of lines drawn through mounting brackets 36 of that pattern. The segments of the first helical pattern are denoted by the alpha-numeric designations 1A, 1B, 1C, 1D, 1E, 1F and 1G, and the segments or ranks of the second helical pattern are denoted by the alpha-numeric designations 2A, 2B, 2C, 2D, 2E, 2F and 2G. Adjacent ones of the threshing elements 34 along each of the helical patterns are located or spaced about equidistant apart, respectively.

To illustrate the spacing of the helical patterns according to the invention, referring to segment 1A, it can be seen that the four mounting brackets 36 of that segment are equidistant along line 1A, as are mounting brackets 36 of the other segments of both helical patterns. Additionally, a helical pitch Y of the pattern at any location therelong is determined by an angle of a line extending between adjacent ones of threshing elements 34, and thus also mounting brackets 36, relative to a line perpendicular to the rotational axis, as illustrated at various locations along the patterns in FIG. 5. Referring in particular to FIG. 5, the helical pitches Y of both of the helical patterns preferably have a generally constant value, that is, no more than a marginally varying value, through a first or threshing region of the rotor located adjacent to the front portion 26 comprising about segments 1A-1B and 2A-2B, and the helical patterns are continuously and substantially uniformly spaced about a first axial distance 38 apart one relative to the other throughout the first region. The helical pitches Y of the helical patterns have values which preferably gradually or progressively increase from the first value through a second or transition region of the rotor extending from the first region toward the rear portion of the rotor, comprising about segments 1C-1E and 2C-2E, such that throughout the second region the helical patterns are continuously spaced gradually increasing axial distances 40, 42, 44, 46 and 48 apart toward the rear portion of the rotor. And, the helical pitches Y of the helical patterns are preferably generally constant at, or vary only marginally from, through a third or separating region extending rearwardly from the second region to the rear portion of the rotor and generally comprising segments 1F, 1G, 2F and 2G, such that throughout the third region the helical patterns are continuously and substantially uniformly spaced about an axial distance 50 apart which is several times greater than axial distance 38.

Here, it should be understood that the number of segments or revolutions of the helical patterns within each of the above described first, second and/or third regions, can vary as desired or required for a particular application. It should also be noted that the connotations "threshing" region, "transition" region and "separating" region, are intended to be generally descriptive of a primary, but not the only, function occurring within those respective regions, and are not to be interpreted as limiting in any way whatsoever.

As illustrative values, the first value for the helical pitch Y can comprise an angle of from about 6 to about 10 degrees relative to a line perpendicular to the rotational axis, and more preferably, an angle of about 9 degrees. The second value can comprise an angle of from about 12 to about 15 degrees relative to a line perpendicular to the rotational axis, and more preferably, about 13 to about 14 degrees. And, the values for helical pitch Y in the second or transitional region will increase gradually from the first value to the second value, for instance, by about 1-2 degrees or so, for each of the revolutions or segments of that region. Here, it should be emphasized that these are representative values, found to provide the desired advantages of the invention for the twin rotor configuration illustrated, but is not intended to be limiting.

As result, the axial distance 50 between the helical patterns in the third region is equal to at least 4 times axial distance 38 within the first region, and more preferably, about 5 times the axial distance. This progressive threshing element arrangement of the invention has been found to be advantageous, as it provides a desired density of the threshing elements for intense threshing and separation within the first region of the rotor, and a progressing transition to more separating and less threshing thereafter.

An advantage of the present invention is that the likelihood of formation of substantial clumps of crop material is reduced, as elongate or wide separator bars are not used. This advantage also reduces the power needed to drive the rotors 20 and 22, since increased power is required when substantial clumps of material impact against elongated elements. Further, the incidence of torque spikes in the rotors 20 and 22 is reduced, which prolongs the effective life of the rotors.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A rotor assembly for a threshing system of an agricultural combine, comprising:

an elongate rotor having a front inlet portion, a rear portion and a generally cylindrical outer surface disposed between the front portion and the rear portion, the rotor being rotatable about a longitudinally extending rotational axis therethrough;

a plurality of threshing elements mounted individually on the outer surface in at least two axially spaced apart, continuous helical patterns therearound extending from about the front inlet portion to about the rear portion, adjacent ones of the threshing elements along each of the helical patterns being located about equidistant apart, respectively, and defining a helical pitch of the helical pattern therebetween; and wherein the helical pitches of the helical patterns have a generally constant first value through a first region of the rotor located adjacent to the front inlet portion, and the helical patterns are continuously and substantially uniformly spaced about a first axial distance apart throughout the first region; the helical pitches of the helical patterns have values which gradually increase from the first value to a second value greater than the first value through a second region of the rotor extending from the first region toward the rear portion of the rotor, such that throughout the second region the helical patterns are continuously spaced an axial distance apart, wherein the axial distances between the helical patterns of the second region gradually increase in size in a direction toward the rear portion of the rotor; and the helical pitches of the helical patterns are generally constant at the second value through a third region extending rearwardly from the second region to the rear portion of the rotor, such that throughout the third region the helical patterns are continuously and substantially uniformly spaced about a second axial distance apart which is several times greater than the first axial distance.

2. The rotor assembly of claim 1, wherein the first value comprises an angle of from about 6 to about 10 degrees relative to a line perpendicular to the rotational axis.

3. The rotor assembly of claim 1, wherein the second value comprises an angle of from about 12 to about 15 degrees relative to a line perpendicular to the rotational axis.

4. The rotor assembly of claim 1, wherein the second axial distance is equal to at least 4 times the first axial distance.

5. The rotor assembly of claim 4, wherein the second axial distance is equal to about 5 times the first axial distance.

6. The rotor assembly of claim 1., wherein each of the threshing elements is a rasp bar comprising rows of serrations configured for threshing crop material during rotation of the rotor.

7. The rotor assembly of claim 1, wherein the first region comprises at least two revolutions of each of the helical patterns about the rotor, the second region comprises at least about two revolutions of each of the patterns, and the third region comprises at least about three revolutions of each of the patterns.

8. A rotor assembly for a threshing system of an agricultural combine, comprising:

an elongate rotor having a front inlet portion, a rear portion and a generally cylindrical outer surface disposed between the front portion and the rear portion, the rotor being rotatable about a longitudinally extending rotational axis therethrough;

a plurality of threshing elements mounted on the outer surface in at least two generally parallel helical patterns therearound extending from about the front inlet portion to about the rear portion, adjacent ones of the threshing elements along each of the helical patterns being located about equidistant apart, respectively, and defining a helical pitch of the helical pattern therebetween, the helical patterns having a threshing region located adjacent to the front inlet portion of the rotor, a separating region adjacent to the rear portion, and a transition region extending between the threshing region and the separating region; and wherein the helical pitches of the helical patterns have a generally constant first value through the threshing region such that the helical patterns are continuously and substantially uniformly spaced about a first axial distance apart through the threshing region; the helical pitches of the helical patterns in the transition region have values which gradually increase from the first value to a second value greater than the first value such that the helical patterns are continuously spaced axially apart by distances which gradually increase in size from the first axial distance to a second axial distance in a direction toward the rear portion; and the helical pitches of the helical patterns are generally constant at the second value through the separating region such that helical patterns are continuously spaced about a second axial distance apart which is several times greater than the first axial distance.

9. The rotor assembly of claim 8, wherein the first value comprises an angle of from about 6 to about 10 degrees relative to a line perpendicular to the rotational axis.

10. The rotor assembly of claim 8, wherein the second value comprises an angle of from about 12 to about 15 degrees relative to a line perpendicular to the rotational axis.

11. The rotor assembly of claim 8, wherein the second axial distance is equal to at least 4 times the first axial distance.

12. The rotor assembly of claim 11, wherein the second axial distance is equal to about 5 times the first axial distance.

13. The rotor assembly of claim 8, wherein each of the threshing elements is a rasp bar comprising rows of serrations configured for threshing crop material during rotation of the rotor.

14. The rotor assembly of claim 8, wherein the first threshing region comprises at least two revolutions of each of the helical patterns about the rotor, the transition region comprises at least about two revolutions of each of the patterns, and the separating region comprises at least about three revolutions of each of the patterns.

15. A rotor assembly for a threshing system of an agricultural combine, comprising:

an elongate rotor having a front inlet portion, a rear portion and a generally cylindrical outer surface disposed between the front portion and the rear portion, the rotor being rotatable about a longitudinally extending rotational axis therethrough;

a plurality of threshing elements mounted individually on the outer surface in at least two generally parallel helical patterns therearound extending continuously from about the front inlet portion to about the rear portion, the threshing elements along each of the helical patterns being located about equidistant apart, respectively, and defining a helical pitch of the helical pattern therebetween, the helical patterns having a threshing region located adjacent to the front inlet portion of the rotor, a separating region adjacent to the rear portion, and a transition region extending between the threshing region and the separating region; and wherein the helical pitches of the helical patterns have a generally constant first value of about 9 degrees relative to a line perpendicular to the rotational axis through the threshing region such that the helical patterns are substantially uniformly and continuously spaced about a first axial distance apart through the threshing region; the helical pitches of the helical patterns in the transition region have values which gradually increase in size from 9 degrees to at least about 13 degrees such that the helical patterns are spaced axial apart by distances which gradually and continuously increase toward the separating region; and the helical pitches of the helical patterns are generally constant at at least about 13 degrees through the separating region, such that helical patterns are substantially uniformly spaced about a second axial distance apart continuously through the separating region which is several times greater than the first axial distance.

16. The rotor assembly of claim 15, wherein the second axial distance is equal to at least 4 times the first axial distance.

17. The rotor assembly of claim 16, wherein the second axial distance is equal to about 5 times the first axial distance.

18. The rotor assembly of claim 15, wherein each of the threshing elements is a rasp bar comprising rows of serrations configured for threshing crop material during rotation of the rotor.

19. The rotor assembly of claim 15, wherein the first threshing region comprises at least two revolutions of each of the helical patterns about the rotor, the transition region comprises at least about two revolutions of each of the patterns, and the separating region comprises at least about three revolutions of each of the patterns.

* * * * *